Aug. 3, 1943.　　　　A. EISELE　　　　2,325,996
GAUGE
Filed Jan. 15, 1941　　　2 Sheets-Sheet 2
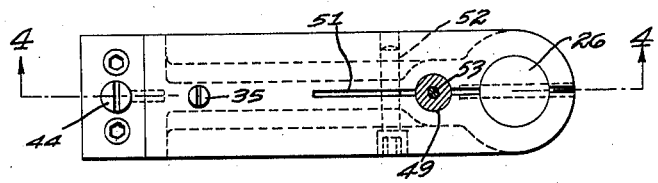
Fig. 3.
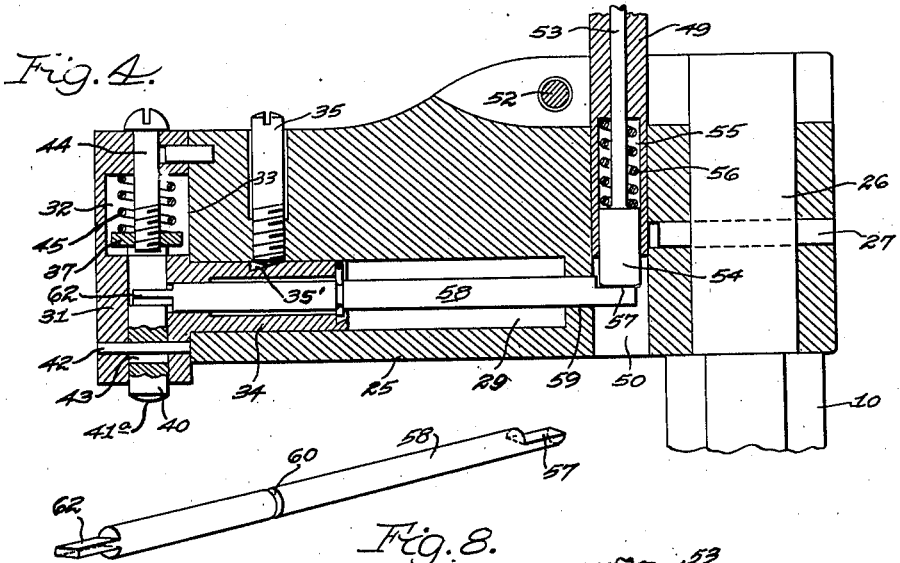
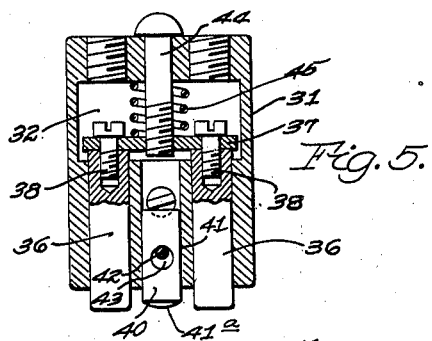
Fig. 5.
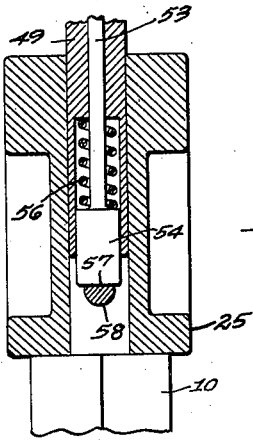
Fig. 7.
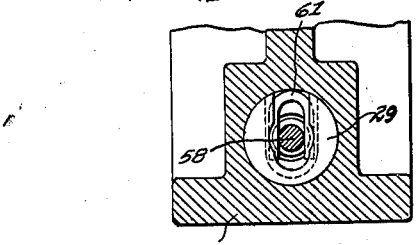
Fig. 6.
Inventor
Andrew Eisele
By
Attorneys Patented Aug. 3, 1943

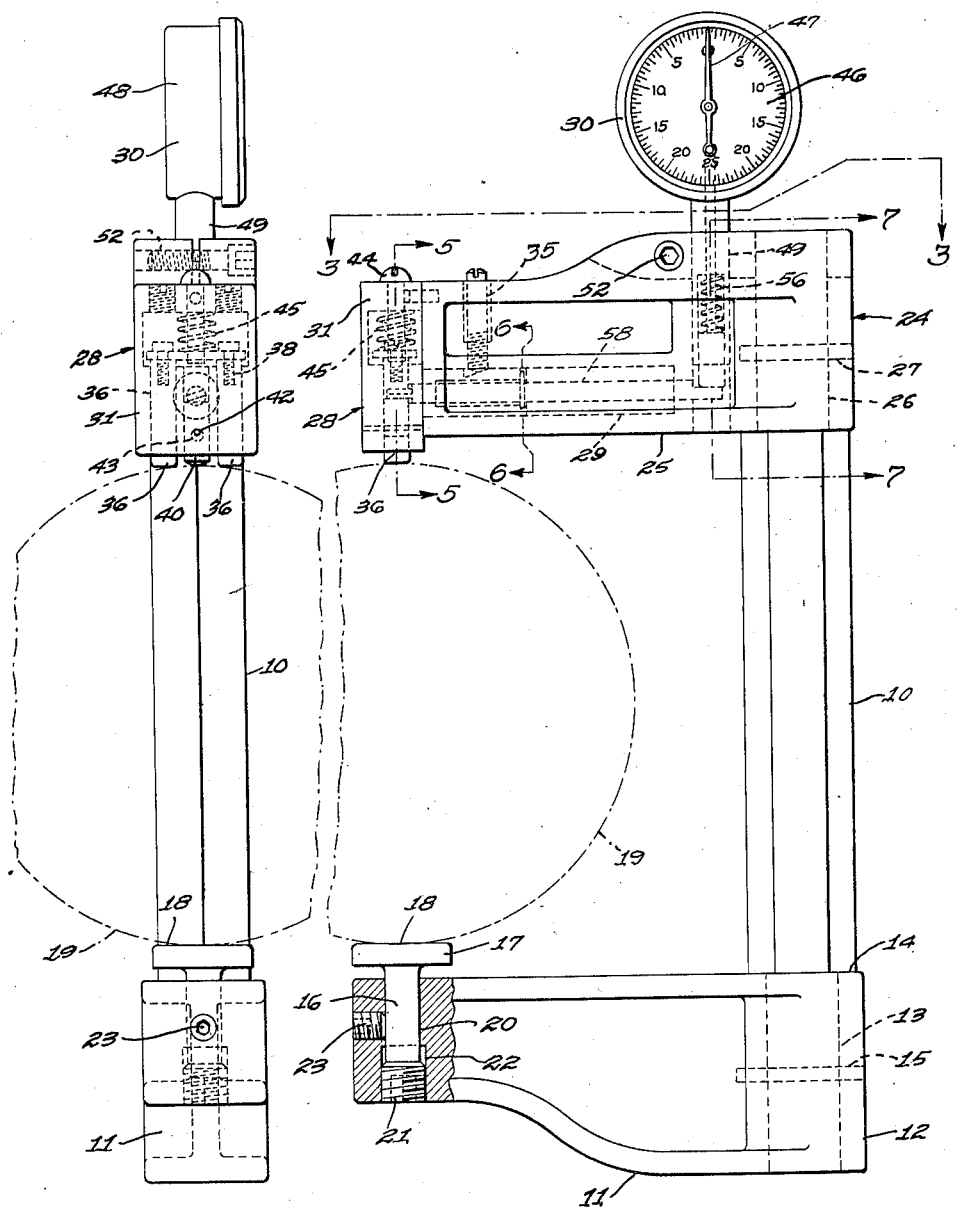

2,325,996

UNITED STATES PATENT OFFICE 2,325,996

GAUGE

Andrew Eisele, Detroit, Mich.

Application January 15, 1941, Serial No. 374,535

5 Claims. (Cl. 33—178)

This invention relates generally to gauges and more particularly to gauges for checking or testing external dimensions or diameters of parts.

It is an object of the present invention to provide a new and improved external gauge of a character which will permit accurate yet rapid checking of outer dimensions of parts.

Another object of the invention is to provide a gauge of the above mentioned character in which the operating and indicating mechanisms are removable as a unitary structure from the gauge assembly to easily and quickly assemble gauges to check different size outer dimensions or diameters of parts.

Other objects of the invention will become apparent from the following detailed description taken in connection with the accompanying drawings in which:

Fig. 1 is a side view of the gauge shown partly broken away and in section;

Fig. 2 is an end view of the gauge looking from left to right of Fig. 1;

Fig. 3 is a top plan view partly in section of the gauge, taken along the line 3—3 of Fig. 1;

Fig. 4 is an enlarged fragmentary view of the gauge, taken along the line and in the direction of the arrows 4—4 of Fig. 3;

Fig. 5 is a cross sectional view of the gauge, taken along the line 5—5 of Fig. 1;

Fig. 6 is a fragmentary cross sectional view of the gauge, taken along the line 6—6 of Fig. 1;

Fig. 7 is a fragmentary cross sectional view of the gauge, taken along the line 7—7 of Fig. 1; and Fig. 8 is a perspective view of a part of the gauge mechanism shown removed therefrom.

Referring to the drawings by characters of reference, the gauge shown includes an elongated supporting member or rod 10 which provides a handle for the device, and to one end of and extending laterally from the handle is attached an elongated arm 11. The arm 11 is provided at one end thereof with a hollow boss 12 to receive a reduced end portion 13 of the rod 10, the boss 12 seating against a shoulder 14 provided on the rod 10 by the reduced portion 13. The arm 11 is tightly but detachably secured to the rod by a removable pin 15 which extends through aligned transverse apertures provided in the boss 12 and in the rod reduced portion 13. Carried by the arm 11, adjacent its other or outer end, there is an adjustable abutment member 16 having a head 17 providing an upper abutment surface 18 for engaging the outer periphery or surface of a part such as the part 19 to be tested. The adjustable abutment member 16 includes a stem which is received in a vertical bore 20 provided in the arm 11, the adjustment member 16 having a threaded lower end portion 21 which is screwthreaded into an enlarged threaded bore 22 in the arm 11 to provide for adjustment of the abutment member 16 longitudinally with respect to the supporting rod 10. The abutment member 16 may be held in desired positions of adjustment by a set screw 23 which is preferably screwthreaded into the end of the arm 11 for engaging the stem portion of the abutment member 16.

On the other or opposite end of the supporting rod or handle 10 a unitary removable gauge mechanism 24 is provided having an elongated hollow body 25 which extends laterally from the supporting rod 10 in spaced relation to and in parallelism with the arm 11. The body 25 is preferably substantially rectangular in shape and adjacent one end thereof is provided with a bore to receive a reduced upper end portion 26 of the rod 10, the body 25 being detachably secured to the rod 10 by a transversely extending removable pin 27.

Rigidly secured to the other or outer end of the body 25 there is a unitary removable mechanism, designated in general by the numeral 28, which is operable to actuate an indicator 30 to indicate the accuracy of the outer dimension or diameter of the part 19 or part being tested. The mechanism 28 includes a casing 31 which is preferably rectangular in shape having a recess 32 which is closed by the end wall, as at 33, of the body 25 when the casing 31 is mounted on the body 25. The body 25 is provided with a bore 29 which extends longitudinally thereof and opens through the body end wall 33 to receive an external tubular hollow boss 34 which is integral with and extends from the side wall of the casing 31. The casing 31 is detachably but rigidly secured to the body 25 by a set screw 35 the inner end of which preferably engages in a notch 35' which is provided in the side wall of the casing tubular portion 34.

A pair of vertically extending bores are provided in the casing 31 and extend into the recess 32 and through the lower end of the casing to receive respectively a pair of centering pins 36 the lower ends of which project externally of the casing to engage the outer periphery of the part being checked. The pins 36 are secured together by a plate 37 which is secured to the inner ends of the pins 36 within the recess 32 by screws 38. Positioned between and extending parallel with the pins 36, a removable pin-like feeler member 40 is provided and is guided for movement in a bore 41 which is provided in the casing 31, the axis of the bore 41 being in parallelism with the axes of the pins 36. The feeler member 40 has an end portion projecting externally of the casing 31 to engage the periphery of the part to be tested, the outer end of the member 40 preferably being rounded, as at 41a. Downward movement of the feeler member 40 is limited by a transverse pin 42 in the casing 31 which extends through a relatively large aperture 43 provided in and extending transversely of the feeler member 40 to retain the feeler member in the casing 31. Substantially midway between the centering pins 36 the plate 37 is provided with a threaded aperture to receive an abutment screw 44 which extends upwardly through and is slidably guided in an aperture provided in the top wall of the recess 32. Externally of the casing 31, the adjustment screw 44 is provided with a head for seating on the top wall of said casing to limit downward or outward movement of the pins 36. Surrounding the adjustment screw 44, a helical coil spring 45 is provided which acts against the plate 37 to move the pins 36 outwardly, the pins being limited in such movement by the head of the adjustment screw 44 engaging the top of the casing 31.

The indicator 30 may be of any suitable type, preferably having a dial 46 provided with indicia for registration with a rotatable pointer 47, the mechanism of the indicator being enclosed in a casing 48. Integral with the casing 48 there is a hollow stem 49 which extends into a vertical bore 50 provided in the body 25 which body may be slotted, as at 51, to provide for clamping the stem 49 tightly to the body by means of a screw 52. The indicator 30 includes an operating member or plunger 53 which is slidably guided in the stem 49 and is provided with an enlarged lower end portion 54 guided in an enlarged bore 55 in the lower end of the stem 49. A helical coil spring 56 surrounds the plunger 53 within the bore 55 and acts to maintain the lower end of the plunger in engagement with a flattened end portion 57 of a rod 58 which is rotatably mounted in the tubular portion 34 of the casing 31. The bore 29 in the body 25 is reduced, as at 59, to provide additional bearing support for the rotatable rod 58, the end 57 of which projects into the bore 50 to engage the lower end 54 of the plunger 53. Intermediate its ends, the rod 58 is provided with an annular recess 60 having a U-shaped pin 61 to prevent or limit longitudinal movement of the rod 58. The other end of the rod 58 projects into the bore 41 of the casing 31 and is provided with a flattened end portion 62 for engaging the upper end of the movable feeler member 40. The flattened end portions 57 and 62 of the rod 58 constitute cams to effect rotation of the rod 58 for transferring movement of the feeler member 40 to the plunger 53 of the indicator 30, it being noted that the surfaces of said portions are substantially planar and that the planes occupied thereby are angularly related one to the other so that such transfer of movement may be effectuated.

*Operation*

As previously mentioned, the support 10 not only serves as a common support for the transverse arm 11 and the transverse body 25 but also serves as a handle for the user of the device. To check or test the diameter or outer dimension of a part such as the part 19 it is only necessary to move the device toward the part 19 with the arm 11 and body 25 in straddling relation thereto and move the device to or slightly beyond the position shown in Fig. 1 or such that the feeler member passes over the diameter of the part. The centering pins 36 engaging the periphery of the part 19 will aid the operator in holding the device such that the axis of the feeler member 40 may be kept perpendicular to the center or axis of the part 19, the pins 36 moving inwardly against the action of the spring 45. The feeler member 40, engaging the outer periphery of the part 19, will also be moved inwardly or upwardly against the cam portion 62 of the rod 58 which will cause the rod 58 to rotate and through the cam 57 on the other end thereof will move the plunger 53 upward against the action of the spring 56 to actuate the indicator 30. The indicator 30, of course, will show the checker or operator of the device whether or not the diameter of the part 19 is within the tolerance allowed. Upon moving the device from the part 19 the feeler member 40 will descend by gravity, limited in such movement by the stop pin 42, and the spring 56 of the indicator will move the plunger 53 downwardly which, through the cam 57, will rotate the rod 58 until the cam 62 again engages the upper end of the feeler member 40 which is the normal or starting position of the parts of the gauge. For different size diameters to be tested, the abutment member 16 may be adjusted within limits and the centering pins 36 may also be adjusted by the screw 44 to vary their movement. For example, on checking parts of small diameter the pins 36 will serve more efficiently to center the device if they project further outwardly of the casing 31 than for parts of relatively larger diameter. Also by removing the pins 15 and 27 which secure the arm 11 and the instrument body 25 to the rod 10, the arm and body may be readily removed from the rod 10 and may be mounted on other similar rods of varying length chosen in accordance with the diameter of the part to be tested. It will be seen from the above description that applicant has provided a new and improved gauge for checking or testing external diameters of parts and a gauge so constructed that it may be employed efficiently in connection with high productive methods.

While I have shown and described my invention in detail it is to be understood that the invention is to be limited only by the appended claims for many changes may be made without departing from the spirit and scope of the invention.

What I claim is:

1. In a snap acting gauge employing a fixed contact member and a coaligned movable contact member operable for contacting the opposite external surface portions of a body the dimension of which is to be checked by an indicator operatively connected to the movable contact member and responsive to movement thereof, a centering device comprising, a supporting member, a pair of centering pins carried by said supporting member on opposite sides of the movable contact member for movement in parallelism with the movement of the latter and operable when simultaneously contacting the surface cooperating with the fixed contact member to locate the movable contact member at the point of maximum dimension of the body, bridge means interconnecting said pins, and minutely movable adjustment means operatively interconnecting said supporting member and said bridge means for selectively moving said pins relatively to the movable contact member to adjust the relative positioning of the surface contacting portions of said pins and the movable contact member.

2. In a snap acting gauge employing a fixed contact member and a coaligned movable contact member operable for contacting the opposite external surface portions of a body the dimension of which is to be checked by an indicator operatively connected to the movable contact member and responsive to movement thereof, a centering device comprising, a supporting member, a pair of centering pins carried by said supporting member on opposite sides of the movable contact member for movement in parallelism with the movement of the latter and operable when simultaneously contacting the surface cooperating with the fixed contact member to locate the movable contact member at the point of maximum dimension of the body, bridge means interconnecting said pins, adjustment screw means operatively interconnecting said supporting member and said bridge means for selectively moving said pins relatively to the movable contact member to adjust the relative positioning of the surface contacting portions of said pins and the movable contact member, and a spring arranged between said supporting member and said bridge means for urging movement of said pins in one direction.

3. In a measuring head for a dial indicator snap gauge with an operative plunger in a projection thereof, a frame-like support providing a wall surface at one end thereof and having a longitudinal bore extending from the wall surface and communicating at its other end with a transverse bore, a contact head having a tubular extension projecting into said longitudinal bore, said head having a wall engaging the wall surface of the support, a pin extending from one of said wall surfaces received in an opening in the other surface to prevent rotation of said head relative to said frame, an elongated motion transmitting element rotatably mounted in said longitudinal bore and tubular extension and having contact portions at its opposite end angled relatively to one another, one of said contact portions projecting into the transverse bore and the other contact portion projecting into said contact head and a movable contact member reciprocably mounted in the contact head with an inner part thereof engaging the contact portion projecting therein, the transverse bore being arranged to receive said dial indicator projection with its plunger engaging the other contact portion.

4. In a measuring head for a dial indicator snap gauge with an operative plunger in a projection thereof, a frame-like support providing a wall surface at one end thereof, said support having a longitudinal bore extending from the wall surface and communicating at its opposite end with a transverse bore, a contact head having a wall surface lined flush with and engaging the wall surface of said support, a tubular extension projecting from said wall surface and extending into said bore to center said wall surfaces, means carried by one of said wall surfaces received in an opening in the other wall surface for preventing rotation of said head relative to the support, an elongated motion transmitting element rotatably mounted in said longitudinal bore and tubular extension and having contact portions at its opposite ends angled relatively to one another, one of said contact portions projecting into the transverse bore in the support and the other contact portion projecting into said contact head and a movable contact member reciprocably mounted in the contact head with its inner end engaging one of said contact portions, and said transverse bore being arranged to receive said dial indicator projection with its plunger directly engaging the other contact portion.

5. A measuring head for a dial indicator snap gauge with an operative plunger in a projection thereof, a frame-like support providing an end wall surface, said support having an offset longitudinal bore extending inwardly from said wall surface and communicating at its opposite end with a transverse bore, a contact head having a wall surface with a chamber extending inwardly therefrom adapted to be closed when the contact head wall surface is in engagement with the wall surface of said support, a tubular extension projecting from said wall surface and formed integral with the contact head adapted to be received in the longitudinal bore, means interposed between the wall surfaces of said support and the wall surface of said head for preventing rotation of said head relative to the support, an elongated motion transmitting bar rotatably journaled in the longitudinal bore and supported at one end by the tubular extension and at the other end by a bearing formation adjacent the transverse bore, said bar having contact portions on each end angled with respect to each other and projecting into the contact head and transverse bore and a movable contact member reciprocably mounted in the chambered portion of the contact head with an inner part thereof engaging the contact portion projecting therein, the transverse bore being arranged to receive said dial indicator projection with its plunger engaging the other contact portion.

ANDREW EISELE.